_(12)_ United States Patent
Suzuki

(10) Patent No.: US 8,577,161 B2
(45) Date of Patent: Nov. 5, 2013

(54) REPRODUCTION APPARATUS

(75) Inventor: Toshihiko Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/492,275

(22) Filed: Jun. 8, 2012

(65) Prior Publication Data

US 2012/0314967 A1 Dec. 13, 2012

(30) Foreign Application Priority Data

Jun. 13, 2011 (JP) ................................. 2011-131421

(51) Int. Cl.
*G06K 9/46* (2006.01)
(52) U.S. Cl.
USPC ............ 382/236; 382/232; 382/238; 382/239
(58) Field of Classification Search
USPC .......... 382/236, 238, 239, 232; 386/343, 353, 386/239, 244, 346, 356; 360/13; 369/83; 345/213; 378/19; 348/208.16, 208.3
See application file for complete search history.

(56) References Cited

U.S. PATENT DOCUMENTS

| 7,058,280 | B2 * | 6/2006 | Suzuki | 386/346 |
| 7,889,974 | B2 * | 2/2011 | Oka | 386/278 |
| 7,929,843 | B2 * | 4/2011 | Fujiwara | 386/344 |
| 8,154,606 | B2 * | 4/2012 | Tokuyama | 348/208.16 |
| 8,346,066 | B2 * | 1/2013 | Mizuno et al. | 386/343 |
| 2006/0056801 | A1 | 3/2006 | Suneya | |

FOREIGN PATENT DOCUMENTS

JP 2000-125210 A 4/2000

* cited by examiner

*Primary Examiner* — Anh Do
(74) *Attorney, Agent, or Firm* — Canon USA, Inc., IP Division

(57) ABSTRACT

A reproduction apparatus includes a reproduction unit that reproduces plural moving image data having different frame rates from a recording medium, an output unit that outputs the reproduced moving image data to a display device, a setting unit that sets one of a first and a second reproduction modes, and a control unit that controls the output unit to select some of frames of the reproduced moving image data and output moving image data of the selected frames according to an instruction for high-speed reproduction. In the first reproduction mode, the control unit selects frames at a predetermined frame interval according to reproduction speed for the high-speed reproduction. In the second reproduction mode, the control unit selects frames at a frame interval determined based on the reproduction speed for the high-speed reproduction and a frame rate of the reproduced moving image data.

16 Claims, 10 Drawing Sheets

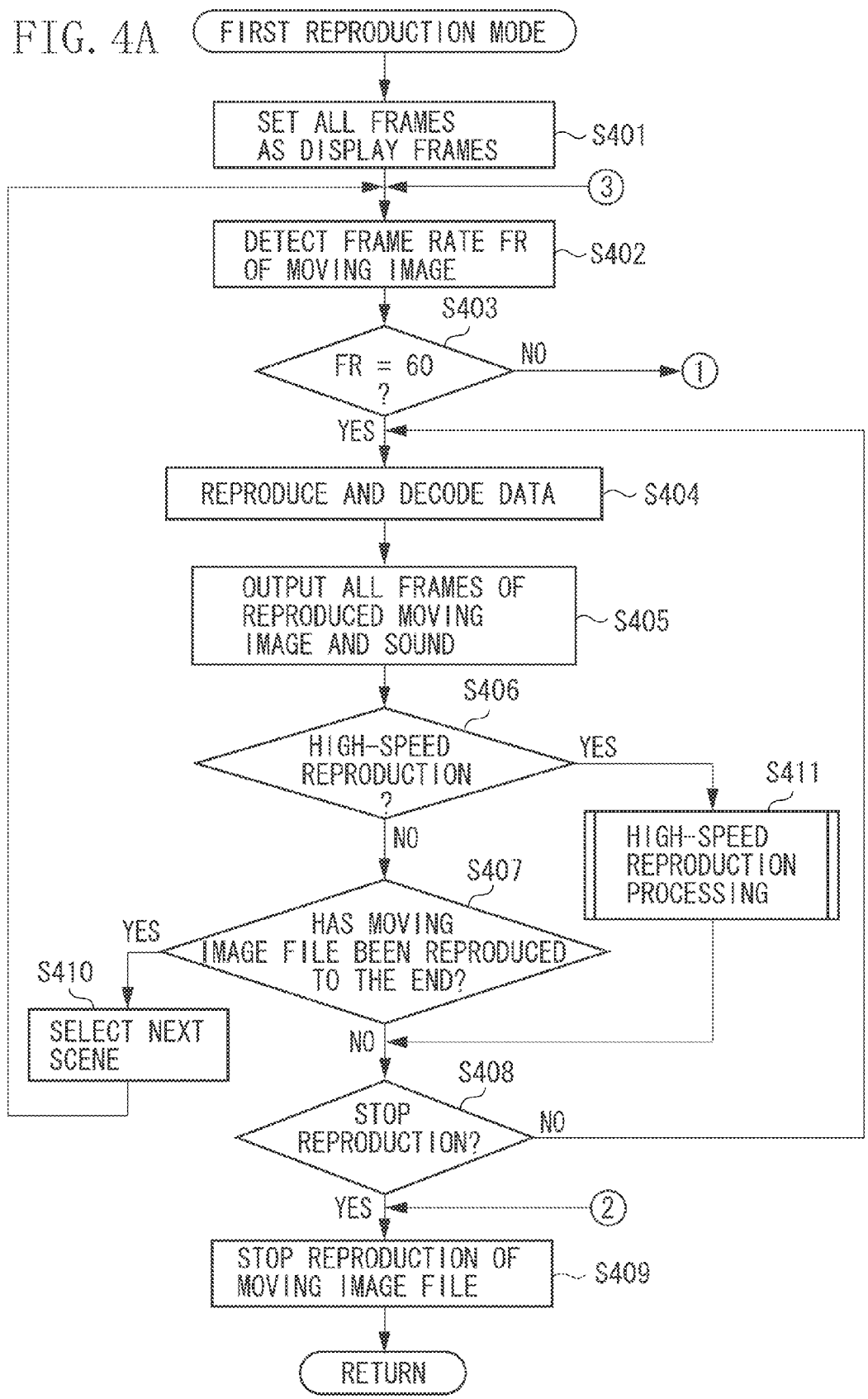

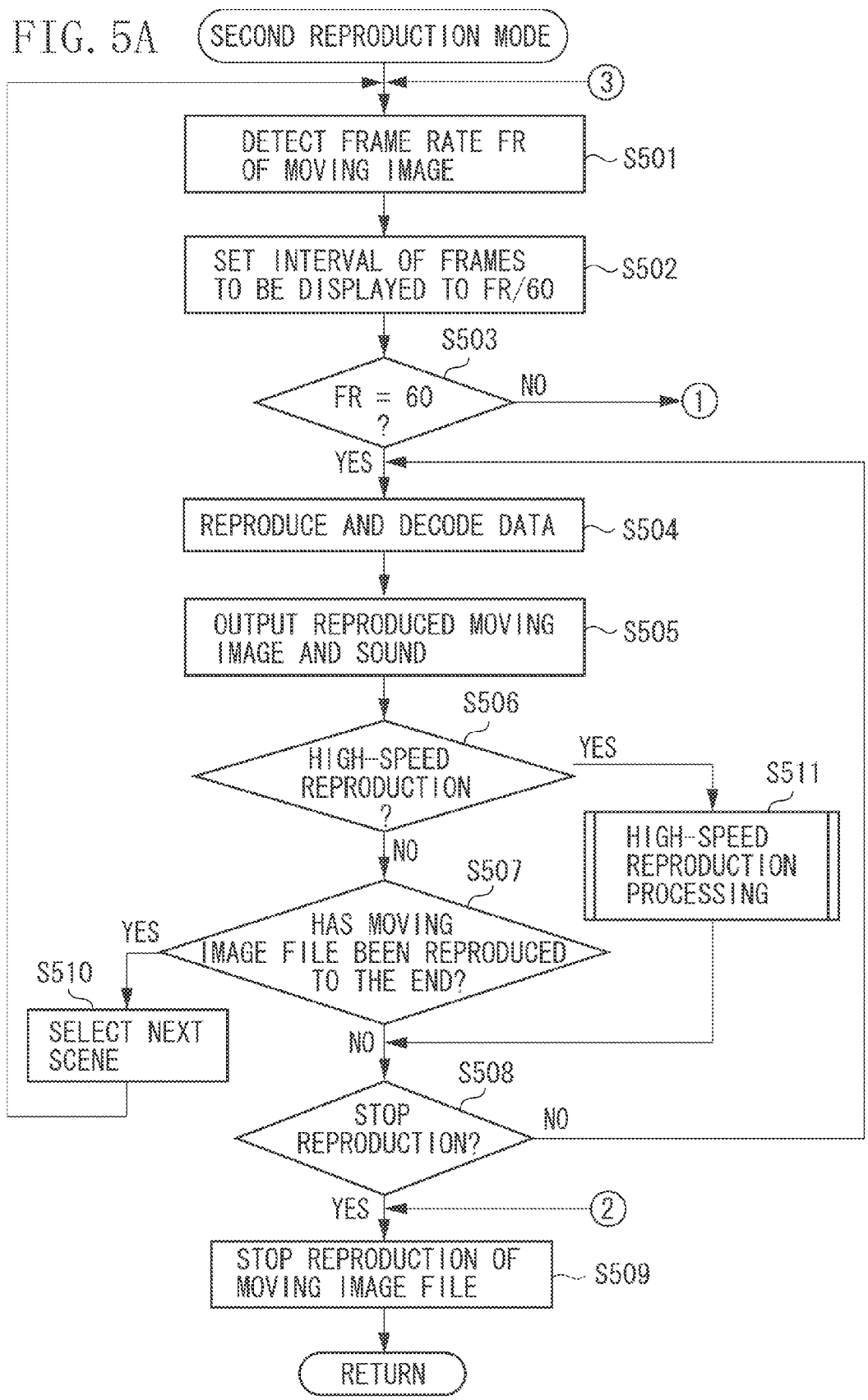

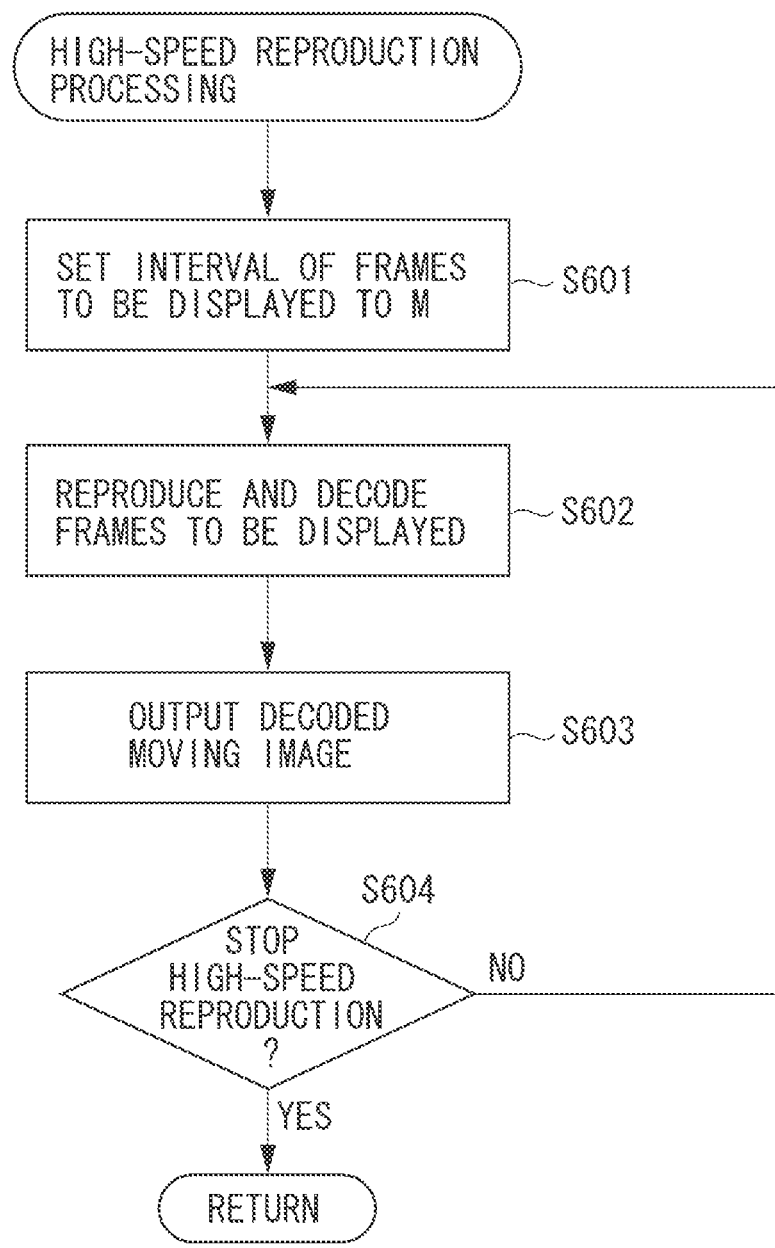

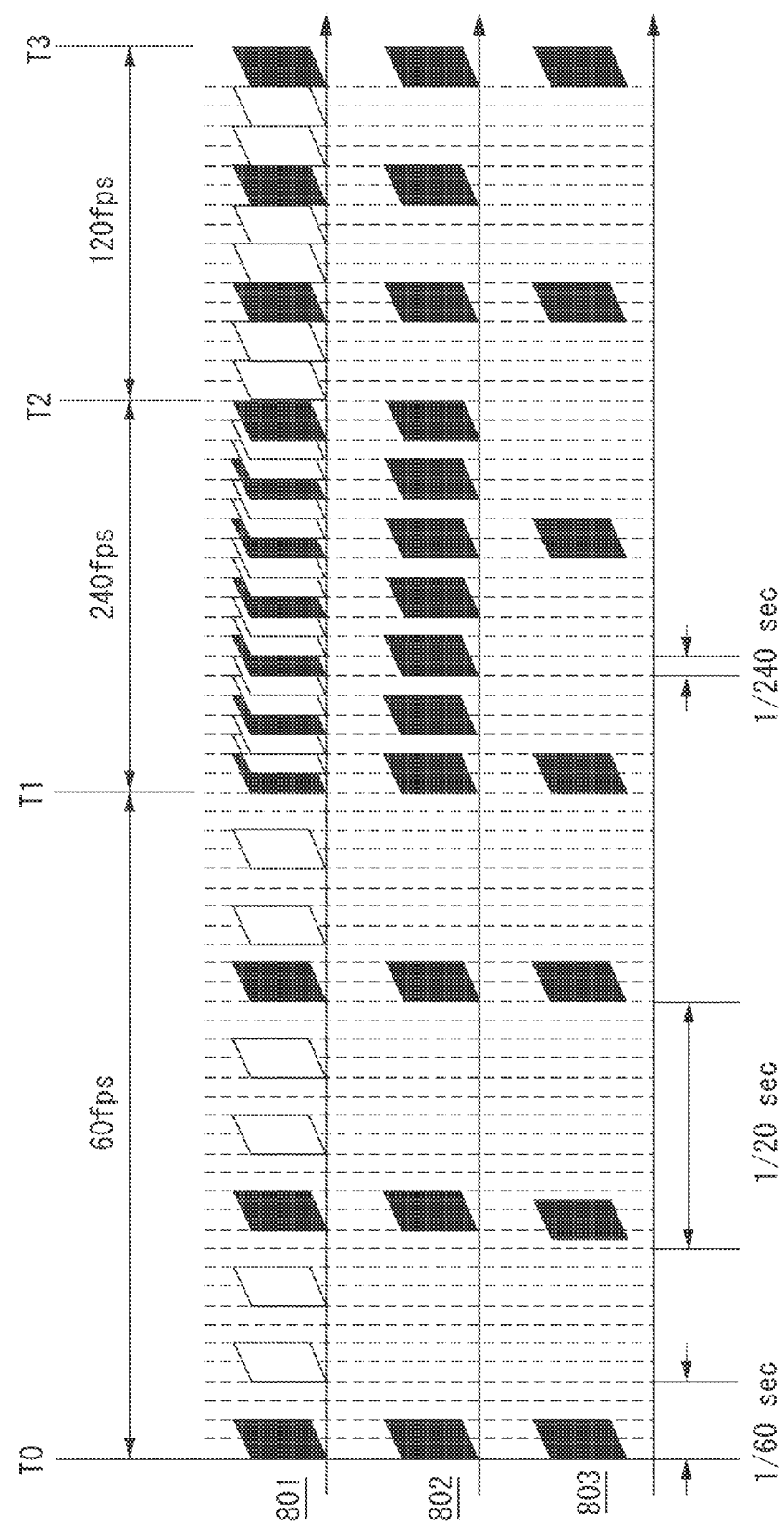

REPRODUCTION APPARATUS

BACKGROUND OF THE INVENTION

1. Field of the Invention

The present invention relates to a reproduction apparatus, and more particularly to a technology suitably used to perform a search reproduction of a plurality of moving images having different frame rates in succession.

2. Description of the Related Art

Video cameras for capturing and recording a moving image on a recording medium have been known heretofore. Apparatuses that can record moving images with different frame rates (the numbers of frames per unit time) have also been discussed in recent years (for example, Japanese Patent Application Laid-Open No. 2000-125210). Moving images captured at different frame rates can be reproduced at a fixed frame rate to provide a slow motion effect and/or a fast motion effect.

For example, if a moving image captured at a frame rate of 120 frames per second (fps) is reproduced at 60 fps, the display interval of frames becomes longer than when captured. Such reproduction provides a slow motion effect of half speed. A moving image captured at 30 fps can be reproduced at 60 fps to provide a double-speed fast motion effect.

A moving image recorded at a high frame rate can be reproduced in real time by displaying the moving image at the same frame rate as when recorded, or by thinning out the frames of the reproduced moving image and displaying the resultant at a low frame rate.

For example, if a moving image captured at a frame rate of 120 fps is reproduced and displayed at a frame rate of 120 fps, the timing of the displayed frames coincides with the display timing during image capturing. If a moving image captured at a frame rate of 120 fps is reproduced and every other frame is thinned out before the resultant is displayed at a frame rate of 60 fps, the timing of the displayed frames coincides with the display timing during image capturing.

As mentioned above, a moving image captured and recorded at a high frame rate can be reproduced at a normal frame rate (60 fps) to provide a slow effect. Fast-forward reproduction of a moving image having a high frame rate, however, results in lower reproduction speed (update period of the displayed screen) than with a moving image having a normal frame rate.

Consequently, there has been a problem of poor usability to a user who wishes to quickly find a desired screen by fast-forward reproduction.

SUMMARY OF THE INVENTION

The present invention is directed to a reproduction apparatus capable of improving usability of high-speed reproduction of moving images having different frame rates.

According to an aspect of the present invention, a reproduction apparatus includes a reproduction unit configured to reproduce moving image data from a recording medium on which the moving image data is recorded, an output unit configured to output the moving image data reproduced by the reproduction unit to a display device, a setting unit configured to set one of a first reproduction mode and a second reproduction mode, and a control unit configured to control the output unit to select some frames of the moving image data reproduced by the reproduction unit and to output moving image data of the selected frames according to an instruction for high-speed reproduction, wherein the control unit selects, in the first reproduction mode, frames to be output for the high-speed reproduction at a predetermined frame interval according to reproduction speed for the high-speed reproduction, and selects, in the second reproduction mode, frames to be output for the high-speed reproduction at a frame interval determined based on the reproduction speed for the high-speed reproduction and a frame rate of the moving image data reproduced by the reproduction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram illustrating a configuration of moving image data to be coded.

FIG. 6 is a flowchart illustrating processing during high-speed reproduction in the first reproduction mode.

FIG. 8 is a diagram illustrating screens to be displayed during high-speed reproduction.

DESCRIPTION OF THE EMBODIMENTS

Various exemplary embodiments, features, and aspects of the invention will be described in detail below with reference to the drawings.

Figure 1:
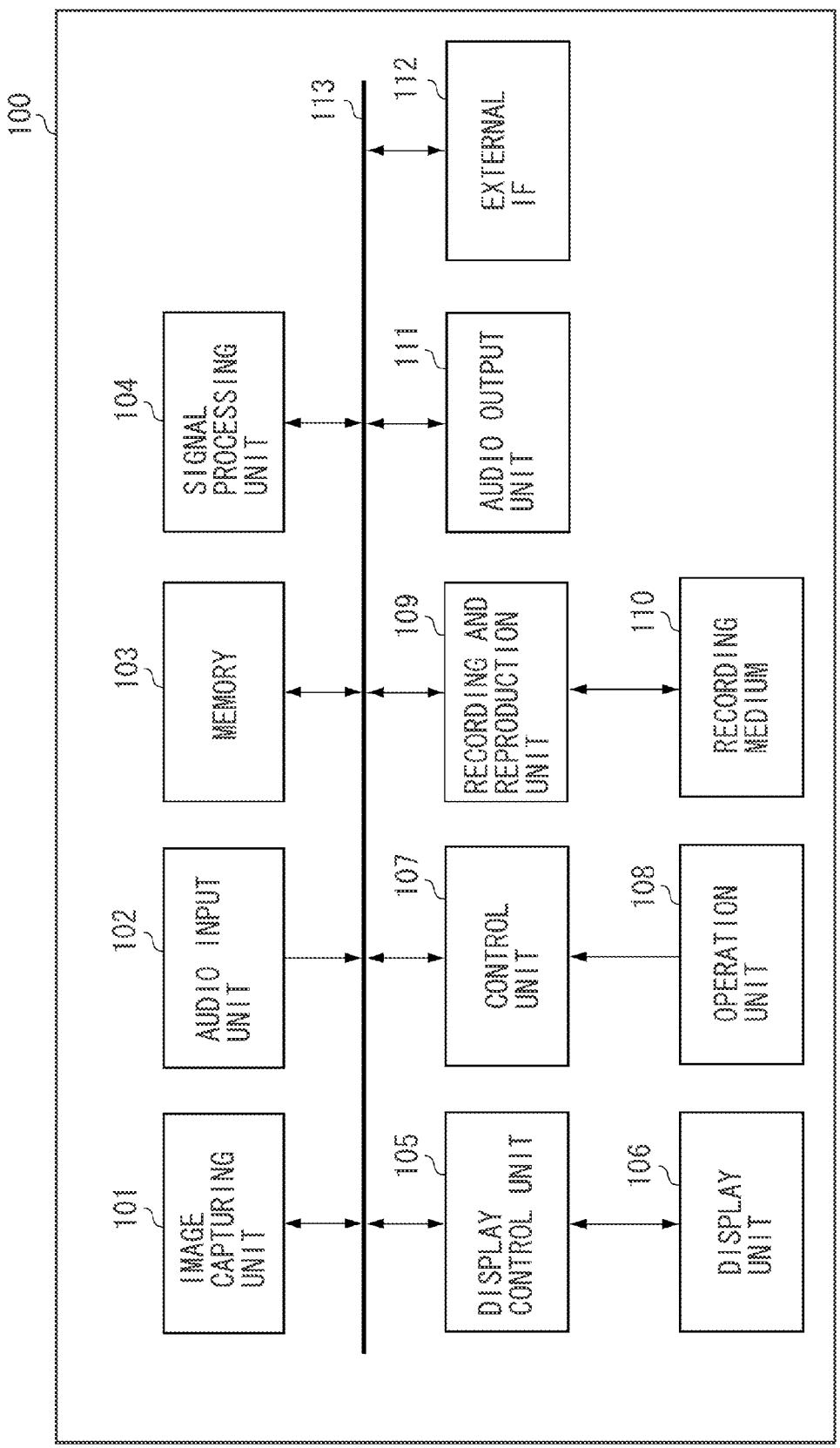
FIG. 1 is a block diagram illustrating an example configuration of an imaging apparatus according to an exemplary embodiment of the present invention.

FIG. 1 is a block diagram illustrating an example configuration of an imaging apparatus 100 according to an exemplary embodiment of the present invention. The imaging apparatus (video camera) 100 of the present exemplary embodiment records moving images and sound according to a predetermined recording format. Moving images and other information recorded on a recording medium are managed as files according to a File Allocation Table (FAT) file system.

The imaging apparatus 100 can change the frame rate (the number of frames per unit time) of a moving image to be captured to anyone of 60 fps, 120 fps, and 240 fps. The imaging apparatus 100 reproduces and displays recorded moving images at 60 fps.

In FIG. 1, an image capturing unit 101 captures an image of an object, and generates and outputs moving image data corresponding to the object. The image capturing unit 101 includes an optical system such as a zoom lens and a focus lens, a complementary metal oxide silicon (CMOS) sensor or the like, an iris, an AD converter for converting captured moving image data into digital data, and a processing circuit for applying necessary processing to captured moving image data.

An audio input unit 102 includes a microphone, an amplifier, and an AD converter. The audio input unit 102 acquires sound from an object and outputs audio data. A memory 103 stores moving image data output from the image capturing unit 101, audio data output from the audio input unit 102, image signals for displaying, compressed moving image data, and other information.

During recording, a signal processing unit 104 applies coding processing according to a known Moving Picture Experts Group (MPEG) method to captured moving image data and audio data. The signal processing unit 104 thereby compresses the amount of information of such data, and stores the resultant into the memory 103. During reproduction, the signal processing unit 104 decodes reproduced moving image data and audio data to decompress the amount of information.

A display control unit 105 outputs moving images and various types of information to a display unit 106 according to instructions from a control unit 107. The display unit 106 includes a known display device such as a liquid crystal panel.

The control unit 107 includes a microcomputer (central processing unit (CPU)) and other necessary memories. According to a program stored in a nonvolatile memory (not-illustrated), the control unit 107 controls the operation of various components of the imaging apparatus 100 based on instructions from an operation unit 108.

The operation unit 108 includes various types of switches including a user-operable power switch, a trigger switch for instructing to start and stop capturing a moving image, a reproduction switch, and a menu switch. The control unit 107 accepts user instructions input through the operation unit 108. The user may operate a menu switch to display a menu screen on the display unit 106. The user may change an operation mode of the imaging apparatus 100 and change settings by using the menu screen.

A recording and reproduction unit 109 records moving image data, audio data, and various information on a recording medium 110, and reproduces moving image data, audio data, and various information from the recording medium 110 according to instructions from the control unit 107. The recording medium 110 is a randomly accessible recording medium such as a memory card and a hard disk drive (HDD).

In the present exemplary embodiment, the recording medium 110 is a replaceable memory card with a built-in flash memory. The user can easily load and eject the recording medium 110 into/from the imaging apparatus 100 by using a loading and ejecting mechanism (not-illustrated).

An audio output unit 111 includes a speaker and an amplifier. The audio output unit 111 outputs reproduced sound. An external interface (IF) 112 communicates moving images, audio data, and other information with external devices such as a personal computer (PC) and an external display device. An internal bus 113 is used to transfer various types of data and commands between the components of the imaging apparatus 100.

Next, recording processing of the imaging apparatus 100 will be described. When the imaging apparatus 100 is powered on through the operation unit 108, the control unit 107 controls each unit to store moving image data obtained by the image capturing unit 101 into the memory 103.

The control unit 107 sets a frame rate to 60 fps, and controls the image capturing unit 101 to output captured image data. The control unit 107 then outputs a moving image of an object according to the moving image data stored in the memory 103 to the display unit 106 for displaying, and enters a recording standby state.

In the recording standby state, the user may operate the operation unit 108 to set the frame rate of a moving image to be captured to any one of the plurality of frame rates mentioned above. The user is not allowed to change the frame rate of the moving image to be captured between the start and end of image capturing.

If an instruction to start recording is given from the operation unit 108 in the recording standby state, the control unit 107 checks the current setting of the frame rate. The control unit 107 instructs the image capturing unit 101 to generate moving image data at the set frame rate. The control unit 107 also instructs the signal processing unit 104 to code the moving image data generated by the image capturing unit 101 and audio data.

In the present exemplary embodiment, the signal processing unit 104 codes the generated moving image according to an MPEG method. In MPEG methods, each frame of a moving image is coded by using any one of intraframe coding (I-frame), interframe forward predictive coding (P-frame), and interframe bidirectional predictive coding (B-frame).

According to MPEG methods, coding is performed in units of a predetermined number of frames called a group of pictures (GOP). The present exemplary embodiment will be described on the assumption that a single GOP includes 15 frames. Each GOP includes one I-frame, along with P-frames at intervals of two frames (one frame in every three frames).

FIG. 2 illustrates a GOP. A data string 201 illustrates a GOP of moving image data that is output from the image capturing unit 101. A data string 202 shows the coding order of the data string 201. In FIG. 2, the frame with I represents an I-frame. The frames with P represent P-frames. The frames with B represent B-frames. The numerals indicate the input order.

The recording and reproduction unit 109 reads such coded moving image data and audio data from the memory 103, and records the read data on the recording medium 110. If the set frame rate is other than 60 fps, the control unit 107 instructs each component to disable coding and recording of audio data. Moving images having a frame rate of 120 fps or 240 fps are thus recorded without sound.

Suppose that after the recording of a moving image and sound is started, an instruction to stop recording is given from the operation unit 108. In such a case, the control unit 107 instructs the recording and reproduction unit 109 to stop recording the moving image. The control unit 107 instructs the recording and reproduction unit 109 to generate additional information including information on the frame rate of the moving image data and record the generated additional information on the recording medium 110 as additional information of a moving image file. In the present exemplary embodiment, a series of moving images and sound recorded between an instruction to start recording and an instruction to stop recording are managed as a single file.

The control unit 107 instructs the recording and reproduction unit 109 to update a management file recorded on the recording medium 110. The management file is a file that contains information indicating the recording locations and filenames of files recorded on the recording medium 110 and/or the order of reproduction of moving image files.

FIG. 8 illustrates moving image data that is captured and recorded as described above. Moving image data 801 includes a 60-fps moving image in the period from T0 to T1, a 240-fps moving image in the period from T1 to T2, and a 120-fps moving image in the period from T2 to T3. The time axis of FIG. 8 corresponds to the lapse of real time during recording.

Next, reproduction processing will be described. Suppose that the user operates the operation unit 108 to instruct switching to a reproduction mode. The control unit 107 instructs the recording and reproduction unit 109 to read the beginning of moving image files recorded on the recording medium 110.

The control unit 107 instructs the signal processing unit 104 to decode the beginning of the moving image files and generate thumbnail image data.

The signal processing unit 104 decodes the beginning of the moving image files, reduces the first frames in size to generate thumbnail image data, and outputs the thumbnail image data to the display control unit 105. The display control unit 105 generates an index screen including thumbnail images of a plurality of moving image files. The display control unit 105 outputs the index screen to the display unit 106 for display, along with a cursor image for selecting a thumbnail image and other information.

Based on additional information on the moving image files, the control unit 107 instructs the display control unit 105 to display thumbnail images along with information on the frame rates of the respective moving images.

The user operates the operation unit 108 to select a desired thumbnail image from the plurality of thumbnail images displayed on the index screen and instruct to start reproduction. Under the instruction to start reproduction, the control unit 107 instructs the recording and reproduction unit 109 to reproduce a moving image file corresponding to the selected thumbnail. The recording and reproduction unit 109 reproduces the designated moving image file from the recording medium 110, and temporarily stores the reproduced moving image file into the memory 103.

The signal processing unit 104 reads a reproduced moving image and audio data from the memory 103, decodes the moving image and audio data, and stores the resultant into the memory 103 again. The display control unit 105 reads the decoded moving image data from the memory 103, and displays the reproduced moving image instead of the index screen. The audio output unit 111 reads the decoded audio data from the memory 103, and outputs sound from the speaker.

In the present exemplary embodiment, reproduction modes include a first reproduction mode and a second reproduction mode. The user operates the operation unit 108 to set either one of the first reproduction mode and the second reproduction mode while the reproduction of a moving image is stopped.

In the first reproduction mode, all the frames of high-frame-rate moving images, i.e., 120-fps and 240-fps moving images are reproduced, decoded, and displayed at 60 fps. As a result, in the first reproduction mode, a 120-fps moving image is reproduced by slow reproduction (effect) of ½-fold speed. A 240-fps moving image is reproduced by slow reproduction of ¼-fold speed.

In the second reproduction mode, high-frame-rate moving images are thinned, reproduced, and displayed at 60 fps. High-frame-rate moving images are thereby reproduced so that the update period of the display screen coincides with the update period in real time during image capturing.

More specifically, in the case of a 120-fps moving image, the interval of frames to be displayed is set to two frames. Every other frame is reproduced and displayed. For a 240-fps moving image, the interval of frames to be displayed is set to four frames. Every fourth frame is reproduced and displayed. In the second reproduction mode, the apparent reproduction speed with respect to the real time is thus normal speed regardless of the frame rates of moving images.

Figure 3:
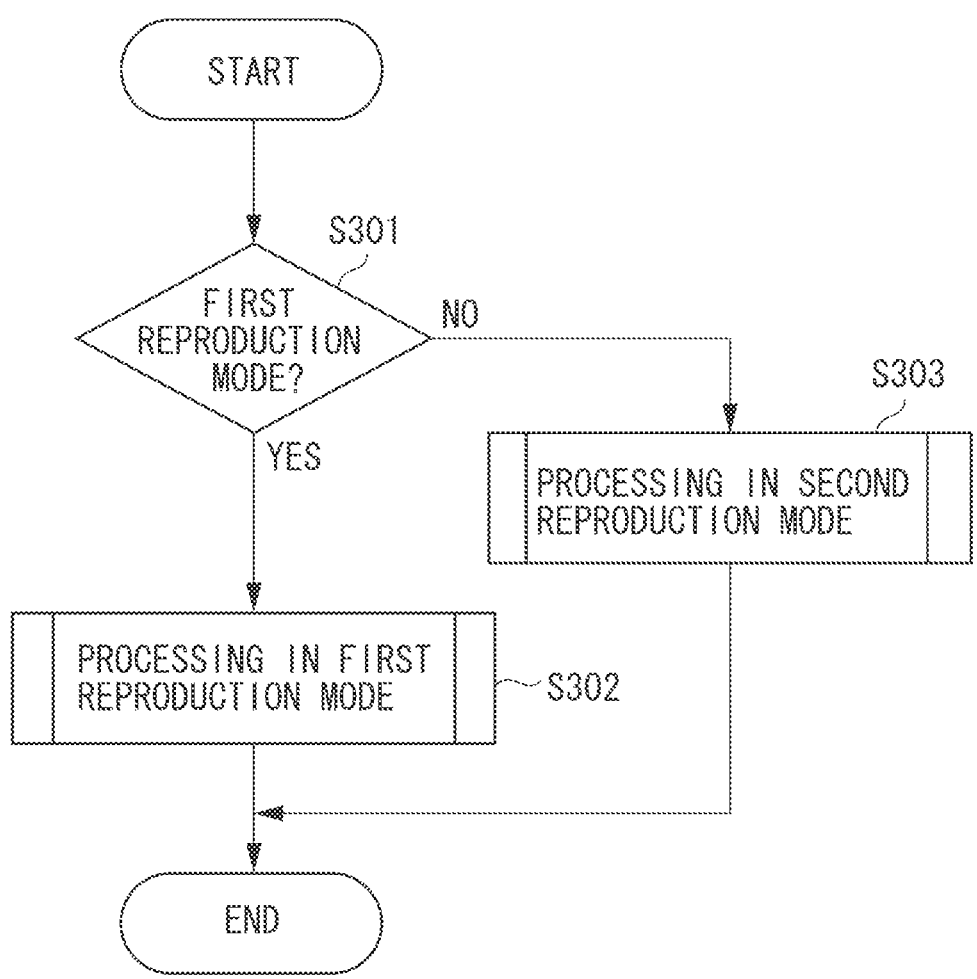
FIG. 3 is a flowchart illustrating processing during reproduction.

FIG. 3 is a flowchart illustrating reproduction processing. The processing of FIG. 3 is performed by the control unit 107 controlling various components. The control unit 107 starts the processing of FIG. 3 when the user selects a desired thumbnail image from an index screen and instructs to start reproduction as described above.

In step S301, the control unit 107 determines whether the reproduction mode currently set is the first reproduction mode or the second reproduction mode. If the first reproduction mode is set (YES in step S301), then in step S302, the control unit 107 performs processing in the first reproduction mode. If the second reproduction mode is set (NO in step S301), then in step S303, the control unit 107 performs processing in the second reproduction mode.

Figure 4B:
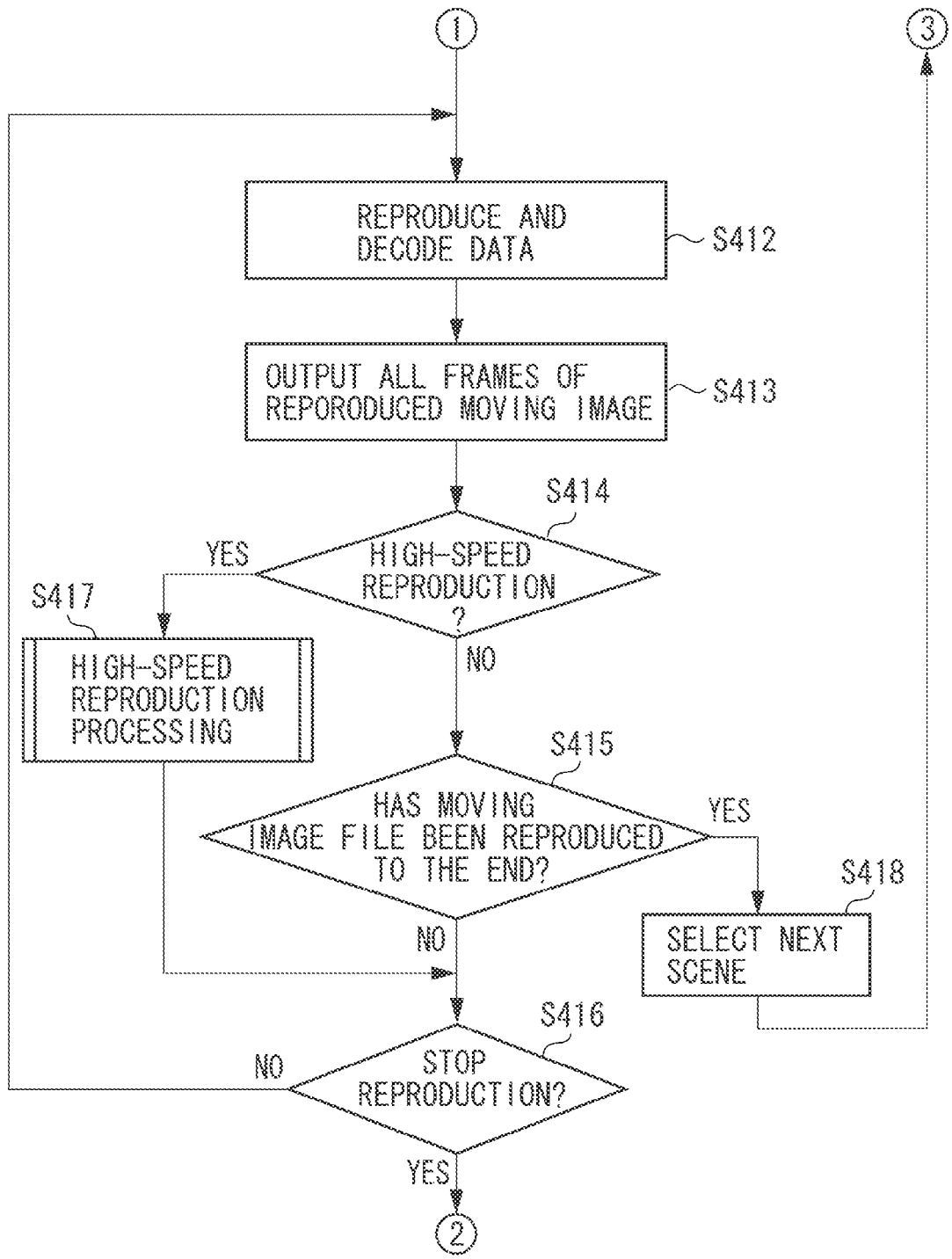
FIG. 4 (including 4A and 4B) is a flowchart illustrating processing in a first reproduction mode.

Next, the processing in the first reproduction mode will be described. FIG. 4 (including 4A and 4B) is a flowchart illustrating processing in the first reproduction mode. In step S401, the control unit 107 sets all the frames of a reproduced moving image as display frames. In step S402, the control unit 107 detects the frame rate FR (fps) of the moving image based on additional information on a selected moving image file. In step S403, the control unit 107 determines whether the frame rate FR is 60.

If the frame rate FR is 60 (YES in step S403), the moving image is recorded with sound. In step S404, the control unit 107 instructs the recording and reproduction unit 109 and the signal processing unit 104 to reproduce and decode moving image data and audio data stored in the selected moving image file in succession from the beginning. In step S405, the control unit 107 instructs the display control unit 105 to output all the frames of the decoded moving image to the display unit 106 for display. The control unit 107 also causes the audio output unit 111 output reproduced sound.

After the start of reproduction, in step S406, the control unit 107 determines whether an instruction for high-speed reproduction (fast-forward reproduction) is given from the operation unit 108. If an instruction for high-speed reproduction is given (YES in step S406), then in step S411, the control unit 107 performs high-speed reproduction processing. The high-speed reproduction processing will be described below.

In step S406, if an instruction for high-speed reproduction is not given (NO in step S406), then in step S407, the control unit 107 determines whether the moving image file currently under reproduction has been reproduced to the end. If the moving image file has been reproduced to the end (YES in step S407), then in step S410, the control unit 107 selects a next scene (moving image file) according to information on the order of reproduction stored in the management file. The processing then returns to step S402.

If the moving image file has not been reproduced to the end (NO in step S407), then in step S408, the control unit 107 determines whether an instruction to stop reproduction is given. If an instruction to stop reproduction is given (YES in step S408), then in step S409, the control unit 107 stops the reproduction of the moving image file. The control unit 107 then causes an index screen to be displayed again. If no instruction to stop reproduction is given (NO in step S408), the processing returns to step S404.

In step S403, if the frame rate FR is not 60 (NO in step S403), no audio data is recorded. In step S412, the control unit 107 instructs the recording and reproduction unit 109 and the signal processing unit 104 to reproduce and decode moving image data stored in the selected moving image file in succession from the beginning. In step S413, the control unit 107 instructs the display control unit 105 to output all the frames of the decoded moving image to the display unit 106 for display.

After the start of reproduction, in step S414, the control unit 107 determines whether an instruction for high-speed reproduction (fast-forward reproduction) is given from the operation unit 108. If an instruction for high-speed reproduction is given (YES in step S414), then in step S417, the control unit 107 performs high-speed reproduction processing. The high-speed reproduction processing will be described below.

In step S414, if no instruction for high-speed reproduction is given (NO in step S414), then in step S415, the control unit 107 determines whether the moving image file currently under reproduction has been reproduced to the end. If the moving image file has been reproduced to the end (YES in step S415), then in step S418, the control unit 107 selects a next scene (moving image file) according to information on the order of reproduction stored in the management file. The processing then returns to step S402.

If the moving image file has not been reproduced to the end (NO in step S415), then in step S416, the control unit 107 determines whether an instruction to stop reproduction is given. If an instruction to stop reproduction is given (YES in step S416), then in step S409, the control unit 107 stops the reproduction of the moving image file. The control unit 107 then causes an index screen to be displayed again. If no instruction to stop reproduction is given (NO in step S416), the processing returns to step S412.

Figure 5B:
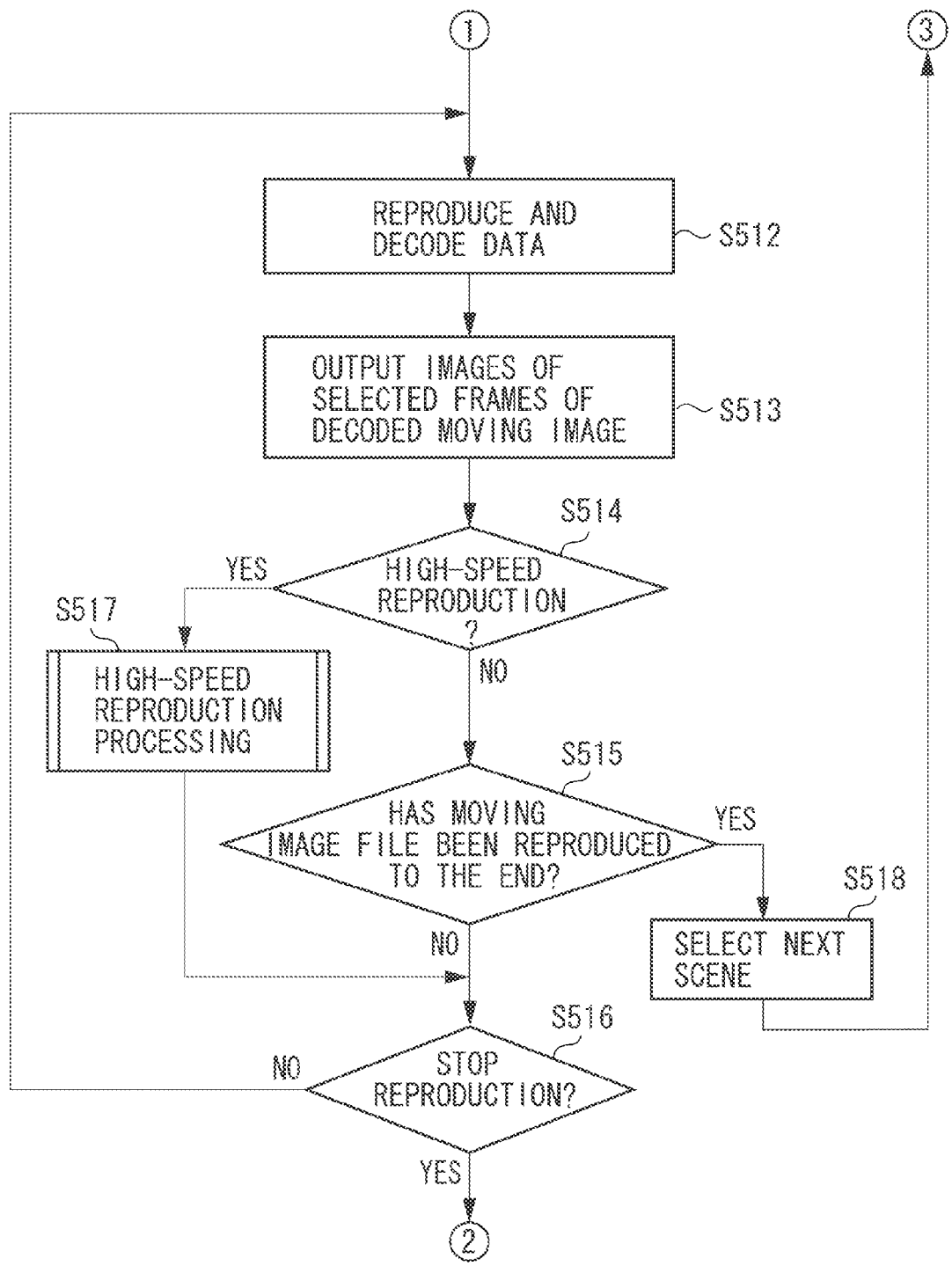
FIG. 5 (including 5A and 5B) is a flowchart illustrating processing in a second reproduction mode.

Next, the processing in the second reproduction mode will be described. FIG. 5 (including 5A and 5B) is a flowchart illustrating processing in the second reproduction mode. In step S501, the control unit 107 detects the frame rate FR (fps) of the moving image based on additional information on a selected moving image file. In step S502, the control unit 107 sets the interval of frames to be displayed of the reproduced moving image to FR/60. In step S503, the control unit 107 determines whether the frame rate FR is 60.

If the frame rate FR is 60 (YES in step S503), the interval of frames to be displayed is one. In other words, all the frames are to be displayed. If the frame rate FR is 60 (YES in step S503), the moving image is recorded with sound. In step S504, the control unit 107, even in the second reproduction mode, instructs the recording and reproduction unit 109 and the signal processing unit 104 to reproduce and decode moving image data and audio data stored in the selected moving image file in succession from the beginning.

In step S505, the control unit 107 instructs the display control unit 105 to output the decoded moving image to the display unit 106 for display. The control unit 107 also causes the audio output unit 111 to output reproduced sound.

After the start of reproduction, in step S506, the control unit 107 determines whether an instruction for high-speed reproduction (fast-forward reproduction) is given from the operation unit 108. If an instruction for high-speed reproduction is given (YES in step S506), then in step S511, the control unit 107 performs high-speed reproduction processing. The high-speed reproduction processing will be described below.

In step S506, if no instruction for high-speed reproduction is given (NO in step S506), then in step S507, the control unit 107 determines whether the moving image file currently under reproduction has been reproduced to the end. If the moving image file has been reproduced to the end (YES in step S507), then in step S510, the control unit 107 selects a next scene (moving image file) according to information on the order of reproduction stored in the management file. The processing then returns to step S501.

If the moving image file has not been reproduced to the end (NO in step S507), then in step S508, the control unit 107 determines whether an instruction to stop reproduction is given. If an instruction to stop reproduction is given (YES in step S508), then in step S509, the control unit 107 stops the reproduction of the moving image file. The control unit 107 then causes an index screen to be displayed again. In step S508, if no instruction to stop reproduction is given (NO in step S508), the processing returns to step S504, and the control unit 107 performs the processing described above.

In step S503, if the frame rate FR is not 60 (NO in step S503), no audio data is recorded. In step S512, the control unit 107 instructs the recording and reproduction unit 109 and the signal processing unit 104 to reproduce and decode moving image data stored in the selected moving image file in succession from the beginning.

If the frame rate FR is 120 fps, the interval of frames to be displayed is two frames. If the frame rate FR is 240 fps, the interval of frames to be displayed is four frames. In step S513, the control unit 107 instructs the display control unit 105 to output the images of frames selected to be displayed of the decoded moving image to the display unit 106 for display.

As described above, in the second reproduction mode, all the moving image data is reproduced and decoded before thinned out for display. To provide a display in time, the decoding processing needs to be performed at higher speed than in the first reproduction mode.

For example, in the first reproduction mode, only 60 frames of a 120-fps moving image need to be decoded in one second. In the second reproduction mode, 120 frames, i.e., twice as much frames of the moving image need to be decoded to display 60 frames thereof.

In the present exemplary embodiment, the signal processing unit 104 therefore decodes moving image data at high speed so that a screen display can be provided in time even when a 240-fps moving image is reproduced in the second reproduction mode.

After the start of reproduction, in step S514, the control unit 107 determines whether an instruction for high-speed reproduction (fast-forward reproduction) is given from the operation unit 108. If an instruction for high-speed reproduction is given (YES in step S514), then in step S517, the control unit 107 performs high-speed reproduction processing. The high-speed reproduction processing will be described below.

In step S514, if no instruction for high-speed reproduction is given (NO in step S514), then in step S515, the control unit 107 determines whether the moving image file currently under reproduction has been reproduced to the end. If the moving image file has been reproduced to the end (YES in step S515), then in step S518, the control unit 107 selects a next scene (moving image file) according to information on the order of reproduction stored in the management file. The processing then returns to step S501.

If the moving image file has not been reproduced to the end (NO in step S515), then in step S516, the control unit 107 determines whether an instruction to stop reproduction is given. If an instruction to stop reproduction is given (YES in step S516), then in step S509, the control unit 107 stops the reproduction of the moving image file. The control unit 107 then causes an index screen to be displayed again. In step S516, if no instruction to stop reproduction is given (NO in step S516), the processing returns to step S512, and the control unit 107 performs the processing described above.

Next, reproduction processing will be described. FIG. 6 is a flowchart illustrating M-fold high-speed reproduction processing (S411 and S417) in the first reproduction mode in detail.

Referring to FIG. 6, in step S601, the control unit 107 sets the interval of frames to be displayed to M according to reproduction speed in high-speed reproduction. In the present exemplary embodiment, moving images are coded according to the GOP configuration illustrated in FIG. 2. During high-speed reproduction, I- and P-frames are selected from the frames illustrated in FIG. 2, and decoded and displayed. The control unit 107 then sets the reproduction speed in high-speed reproduction to three-fold, and sets the interval M of frames to be displayed to three.

With the GOP configuration, I-frames are selected, reproduced, and decoded to enable 15-fold high-speed reproduction. If data read speed from the recording medium 110 and the decoding speed of the signal processing unit 104 are high, the control unit 107 may set the reproduction speed in high-speed reproduction to an arbitrary value other than three.

In step S602, the control unit 107 instructs the recording and reproduction unit 109 and the signal processing unit 104 to reproduce and decode data on the frames to be displayed during high-speed reproduction, i.e., I- and P-frames. In step S603, the control unit 107 instructs the display control unit 105 to output the decoded moving image to the display unit 106 for display.

After the start of high-speed reproduction, in step S604, the control unit 107 determines whether an instruction to stop high-speed reproduction is given from the operation unit 108. For example, if an instruction for normal reproduction or an instruction to stop reproduction is given from the operation unit 108 (YES in step S604), the control unit 107 stops the high-speed reproduction processing, and the processing returns to the processing described in FIG. 4. If no instruction to stop high-speed reproduction is given (NO in step S604), the processing returns to step S602.

In the first reproduction mode, the interval of frames to be displayed is constant regardless of the frame rate of the moving image under reproduction. In FIG. 8, a row 802 illustrates frames to be displayed during high-speed reproduction in the first reproduction mode.

As illustrated in the row 802 of FIG. 8, every third frame is selected and displayed regardless of the frame rate the moving image under reproduction has. The reproduction speed with respect to the real time (elapsed time during image capturing) therefore varies with the frame rate of each moving image.

For example, a 60-fps moving image is reproduced at three-fold speed. A 240-fps moving image is reproduced at ¾-fold speed with respect to the real time. A 120-fps moving image is reproduced at 3/2-fold speed with respect to the real time.

Figure 7:
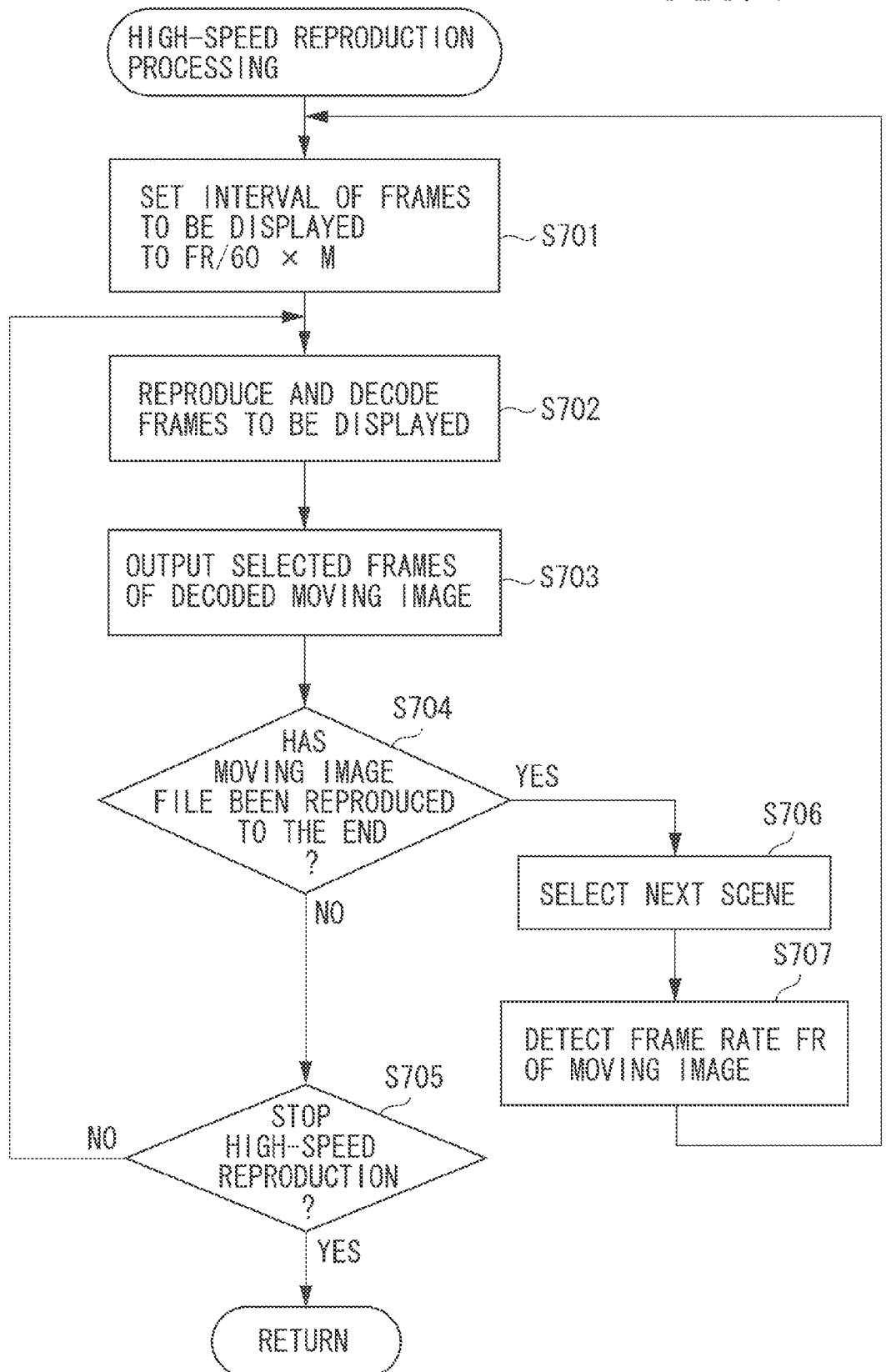
FIG. 7 is a flowchart illustrating processing during high-speed reproduction in the second reproduction mode.

Next, processing during high-speed reproduction in the second reproduction mode will be described. FIG. 7 is a flowchart illustrating the processing during high-speed reproduction in the second reproduction mode. In step S701, the control unit 107 sets the interval of frames to be displayed to FR/60×M according to the reproduction speed in high-speed reproduction and the frame rate of the moving image.

In step S702, the control unit 107 instructs the recording and reproduction unit 109 and the signal processing unit 104 to reproduce and decode data on frames to be displayed during high-speed reproduction, i.e., I- and P-frames. In step S703, the control unit 107 instructs the display control unit 105 to select frames to be displayed of the decoded moving image and output the selected frames to the display unit 106 for display.

In the second reproduction mode, the interval of frames to be displayed is determined according to the frame rate of the moving image under reproduction so that the reproduction speed with respect to the real time is M times that of normal reproduction, i.e., three-fold speed even during high-speed reproduction.

In FIG. 8, the row 803 illustrates frames to be displayed during high-speed reproduction in the second reproduction mode. As illustrated in the row 803 of FIG. 8, the interval of frames to be displayed during high-speed reproduction is determined according to the frame rate of the moving image so that the update interval of frames to be displayed is constant with respect to the lapse of real time.

After the start of high-speed reproduction, in step S704, the control unit 107 determines whether the moving image file under reproduction has been reproduced to the end. If the moving image file has been reproduced to the end (YES in step S704), then in step S706, the control unit 107 selects a next scene based on information on the order of reproduction stored in the management file. In step S707, the control unit 107 detects the frame rate FR of the moving image based on additional information on the moving image file of the selected scene. The processing then returns to step S701.

If the moving image file has not been reproduced to the end (NO in step S704), then in step S705, the control unit 107 determines whether an instruction to stop high-speed reproduction is given from the operation unit 108. For example, if an instruction for normal reproduction or an instruction to stop reproduction is given from the operation unit 108 (YES in step S705), the control unit 107 stops the high-speed reproduction processing, and returns the processing to the processing described in FIG. 5. If no instruction to stop high-speed reproduction is given (NO in step S705), the processing returns to step S702.

As described above, the present exemplary embodiment provides the first reproduction mode and the second reproduction mode. In the first reproduction mode, all frames are reproduced and displayed at a predetermined frame rate. In the second reproduction mode, a high-frame-rate moving image is thinned, reproduced, and displayed at a predetermined frame rate.

During high-speed reproduction in the first reproduction mode, the interval of frames to be displayed is constant regardless of the frame rate of the moving image under reproduction. During high-speed reproduction in the second reproduction mode, frames to be displayed for high-speed reproduction are changed according to the frame rate of the moving image so that the interval of frames displayed is constant with respect to the lapse of real time according to the reproduction speed.

Moving images may be captured at a high frame rate for the sake of a slow effect. The user can reproduce such moving images at high speed in the second reproduction mode to find an intended screen more quickly.

The present exemplary embodiment has the configuration of reproducing captured moving images at 60 fps. However, moving images may be reproduced at other frame rates. For example, suppose that the frame rate for reproduction is FRa (a natural number), and the frame rate at which a moving image is captured is FRb (an integer such as FRb≥FRa). If FRb is equal to FRa, the moving image is recorded with sound. If FRb is not equal to FRa, only the moving image is recorded.

Then, the interval of frames to be displayed in the second reproduction mode may be set to FRb/FRa. The interval of frames to be displayed during high-speed reproduction in the second reproduction mode may be set to FRb/FRa×M.

If FRb is not an integer multiple of FRa, the display timing is determined from the interval of frames to be displayed. Then, frames of the moving image closest to the display timing are selected as frames to be displayed. The higher the frame rate FRb of the moving image, the longer the interval of frames to be displayed.

The exemplary embodiments of the present invention may be implemented by performing the following processing. That is, software (computer program) for implementing the functions of the foregoing exemplary embodiments is supplied to a system or apparatus through a network or various types of computer-readable storage media. A computer (or a CPU or a microprocessing unit (MPU)) of the system or apparatus then reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-131421 filed Jun. 13, 2011, which is hereby incorporated by reference herein in its entirety.

What is claimed is:

1. A reproduction apparatus comprising:
a reproduction unit configured to reproduce moving image data from a recording medium on which the moving image data is recorded;
an output unit configured to output the moving image data reproduced by the reproduction unit to a display device;
a setting unit configured to set one of a first reproduction mode and a second reproduction mode; and
a control unit configured to control the output unit to select some frames of the moving image data reproduced by the reproduction unit and to output moving image data of the selected frames according to an instruction for high-speed reproduction,
wherein the control unit selects, in the first reproduction mode, frames to be output for the high-speed reproduction at a predetermined frame interval according to reproduction speed for the high-speed reproduction, and selects, in the second reproduction mode, frames to be output for the high-speed reproduction at a frame interval determined based on the reproduction speed for the high-speed reproduction and a frame rate of the moving image data reproduced by the reproduction unit.

2. The reproduction apparatus according to claim 1, wherein the control unit, in the first reproduction mode, selects frames to be output for the high-speed reproduction at the predetermined frame interval regardless of the frame rate of the moving image data.

3. The reproduction apparatus according to claim 1, wherein the control unit, in the second reproduction mode, determines the frame interval of frames to be output for the high-speed reproduction so that the higher a frame rate of the moving image data, the greater the frame interval at which frames to be output for the high-speed reproduction are selected.

4. The reproduction apparatus according to claim 1, wherein the control unit, in the second reproduction mode, determines the frame interval of frames to be output for the high-speed reproduction so that an update interval of frames output by the output unit corresponds to a constant lapse of real time during recording of the moving image data, the update interval corresponding to the reproduction speed for the high-speed reproduction.

5. The reproduction apparatus according to claim 1, wherein the control unit controls the output unit to output all the frames of the moving image data reproduced by the reproduction unit if normal reproduction is instructed in the first reproduction mode, and to output some selected frames of the moving image data reproduced by the reproduction unit so that the update period of frames output by the output unit coincides with a lapse of real time during recording of the moving image data if normal reproduction is instructed in the second reproduction mode.

6. The reproduction apparatus according to claim 1, wherein the moving image data is coded by using intraframe coding and interframe predictive coding, and the reproduction speed for the high-speed reproduction relates to an interval of frames of the moving image data coded by the intraframe coding.

7. The reproduction apparatus according to claim 1, wherein the moving image data reproduced by the reproduction means includes image data having different frame rates.

8. The reproduction apparatus according to claim 1, wherein the moving image data reproduced by the reproduction means includes image data having a frame rate higher than the rate at which the output means outputs frames.

9. A reproduction method comprising:
reproducing moving image data from a recording medium on which the moving image data is recorded;
outputting the reproduced moving image data to a display device;
setting one of a first reproduction mode and a second reproduction mode; and
performing control to select some frames of the reproduced moving image data and to output moving image data of the selected frames according to an instruction for high-speed reproduction,
wherein the control is performed so as to select, in the first reproduction mode, frames to be output for the high-speed reproduction at a predetermined frame interval according to a reproduction speed for the high-speed reproduction, and to select, in the second reproduction mode, frames to be output for the high-speed reproduction at a frame interval determined based on the reproduction speed for the high-speed reproduction and a frame rate of the moving image reproduced by the reproducing.

10. The reproduction method according to claim 9, wherein the control is performed, in the first reproduction mode, so as to select frames to be output for the high-speed reproduction at the predetermined frame interval regardless of the frame rates of the moving image data.

11. The reproduction method according to claim 9, wherein the control is performed, in the second reproduction mode, so as to determine the frame interval of frames to be output for the high-speed reproduction so that the higher a frame rate of the moving image data, the greater the frame interval at which frames to be output for the high-speed reproduction are selected.

12. The reproduction method according to claim 9, wherein the control is performed, in the second reproduction mode, so as to determine the frame interval of frames to be output for the high-speed reproduction so that an update interval of output frames corresponds to a constant a lapse of real time during recording of the moving image data, the update interval corresponding to the reproduction speed for the high-speed reproduction.

13. The reproduction method according to claim 9, wherein the control is performed so as to output all the reproduced frames of the moving image data if normal reproduction is instructed in the first reproduction mode, and to output some selected reproduced frames of the moving image data so that the update period of the output frames coincides with a lapse of real time during recording of the moving image data if normal reproduction is instructed in the second reproduction mode.

14. The reproduction method according to claim 9, wherein the moving image data is coded by using intraframe coding and interframe predictive coding, and the reproduction speed for the high-speed reproduction relates to an interval of frames of the moving image data coded by the intraframe coding.

15. A reproduction method according to claim 9, wherein the moving image data reproduced by the reproduction means includes image data having different frame rates.

16. The reproduction method according to claim 9, wherein the moving image data reproduced by the reproduction means includes image data having a frame rate higher than the rate at which the output means outputs frames.

* * * * *